Sept. 28, 1943.    J. R. RIGANDI    2,330,517

FISHING LURE

Filed July 8, 1942

INVENTOR.
JOSEPH R. RIGANDI.
BY Ely Pattison
ATTORNEYS.

WITNESS:

Patented Sept. 28, 1943

2,330,517

UNITED STATES PATENT OFFICE 2,330,517

FISHING LURE

Joseph Ruig Rigandi, Westerleigh, N. Y.

Application July 8, 1942, Serial No. 450,126

9 Claims. (Cl. 43—40)

The present invention relates to new and useful improvements in fishing tackle and more particularly it pertains to a fishing lure.

It is an object of the invention to provide a novel combination of fishing hooks and a bait carrier by means of which the bait is carried independently of the hooks.

It is another object of the invention to provide a novel structure by which the bait is securely retained against loss as so often occurs when the bait is attached directly to the hook.

Another object of the invention is to provide means by which the hook or hooks of the lure are, at all times, free or clear for catching fish.

Still another object of the invention is to provide a novel construction whereby the bait will have freedom of movement resulting in more natural appearance and action of a live bait.

It is still a further object of the invention to provide a device in which the bait may be placed on and removed from the lure without danger of injury to the hands of the person so doing.

Figure 1:
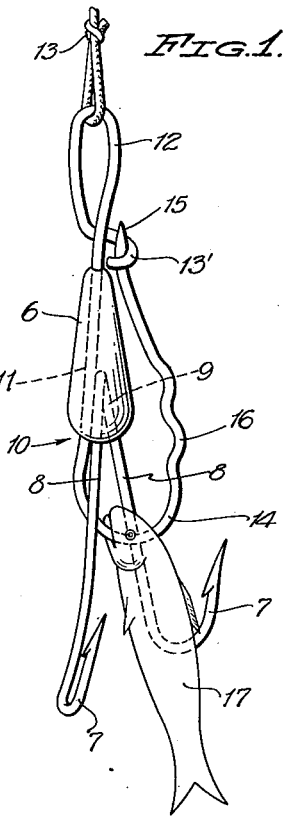
Figure 2:
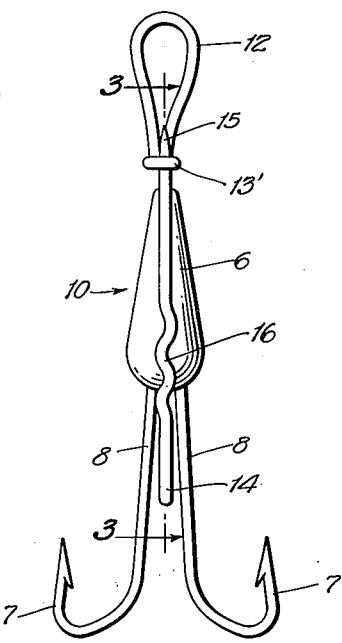

With the above and other objects in view, reference will now be had to the following description, claims and drawing in which, Figure 1 is a perspective view of a fishing lure constructed in accordance with one form of the present invention, Figure 2 is a plan view of that form of the invention illustrated in Figure 1.

Figure 3:
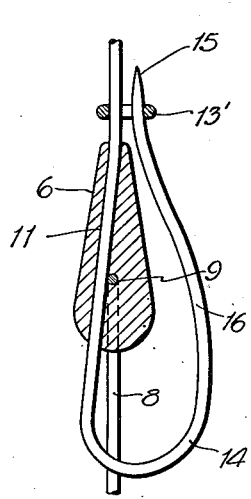
Figures 4, 5:
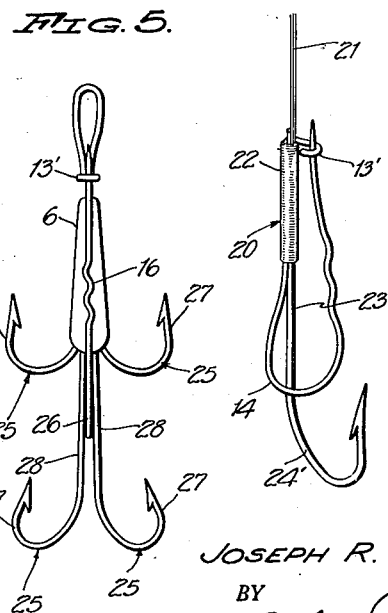

Figure 3 is a longitudinal sectional view taken substantially on the line 3—3 of Figure 2, Figure 4 is a view in side elevation illustrating the invention as applied to a single hook, and, Figure 5 is a plan view of a further modified form in which the invention is illustrated as applied to a gang of four hooks.

Referring specifically to the drawing, the device comprises a body member 6 which is of elongated shape or form and is formed preferably from metal although wood or other materials may be employed where desired.

In that form of the invention illustrated in Figures 1, 2 and 3, the reference character 7 designates two hooks of the ordinary type. The shanks 8 of these hooks are suitably anchored in the body member 6, as at 9 and the hooks extend from one end of the body member 6 in slightly diverging relation to each other.

Also in this form of the invention, there is a rigid member 10 which extends through the body member 6 in which it is suitably anchored as at 11. The ends of this rigid member 10 extend beyond their respective ends of the body member 6, the purpose of which construction will now be described.

One end of the rigid member 10 is formed into a line attaching loop 12 to which a line 13 may be attached as shown and upon its extreme end, this end of the rigid member 10 is formed with a pin retaining loop or eye 13'.

The other end of the member 10 is formed into a bait holding or carrying loop 14 and upon its extreme end it is provided with a piercing point 15. Intermediate of its ends, the bait carrying loop 14 is formed with a waved or otherwise irregular portion 16.

From the foregoing, it will be apparent that the bait holding or carrying loop is an open loop which, however, may be closed by engaging the pin end 15 thereof with the pin retaining loop 13' as shown in the drawing.

It will be noted that the bait holding or carrying loop occupies a position between the shanks 8 of the hooks 7 and that a bait, such as designated 17, trails between the hooks 7 as illustrated in Figure 1 of the drawing.

To attach a bait to the bait holding or carrying loop, it is only necessary to release the pin end 15 from the pin retaining loop or eye 13' and pass the pin end through the bait as shown in Figure 1. The waved or irregular portion 16 of the bait holding or carrying loop 14 is provided to prevent riding of the bait along the pin member of the loop thus, assuring the bait trailing in proper relation to the hooks, when in use.

In that form of the invention illustrated in Figure 4, the body member 20 is of elongated form and a gut or other leader 21, having a line attaching loop, not shown, is employed and it may be secured to the body member 20 by a suitable whipping 22.

The body member 20, in this form of the invention, is also preferably formed of metal and the shank 23 of the hook 24 is suitably anchored therein.

The bait holding or carrying loop 14' is of substantially the same form as that heretofore described differing only in the fact that it does not have the line attaching loop formed upon one end thereof.

In that form of the invention illustrated in Figure 5 of the drawing, there are four hooks 25 which are arranged in pairs which pairs are spaced from each other, as shown.

The bait holding or carrying member 26, in this form of the invention, is of the same construction as that illustrated in Figure 1. However, the looped ends 27 of the hooks in this form of the invention, are turned slightly outward and their shanks 28 are parallel instead of converging, as in Figures 1, 2 and 3.

The outwardly turned looped ends 27 of the hooks 25 provide sufficient space between the hooks to permit free trailing of the bait therebetween and to permit freedom of action of the bait.

From the foregoing, it will be apparent that the present invention provides a fishing lure in which all of the recited objects have been accomplished and which may be constructed in various sizes for use in fishing for large or small fish.

Having thus described the invention, what is claimed as new is:

1. A fishing lure comprising in combination, a body member, a fish hook carried by and projecting from the body member, and a combined line-attaching means and bait carrier comprising a single member extending through the body member with each of its ends extended beyond said body member, a line-attaching loop and a pin-retaining loop formed upon one end of said member, an open bait-carrying loop formed upon the other end of said single member, and a piercing point upon the extremity of the bait-carrying loop and adapted for removable engagement with the pin-retaining loop to close the bait carrying loop to retain a bait thereon.

2. A fishing lure comprising in combination, a body member, a fish hook projecting from the body member, and a combined line-attaching means and bait carrier comprising a single member extending through the body member with each of its ends extended beyond the body member, a line-attaching loop and a pin-retaining loop formed upon one end of said member, an open bait-carrying loop formed upon the other end of said member and extending along the side of the aforementioned fish hook, and a piercing point upon the free end of the bait-carrying loop adapted for removable engagement with the pin-retaining loop to close the bait-carrying loop to retain a bait thereon.

3. A fishing lure comprising in combination, a body member, a pair of hooks carried by the body member and projecting from one end thereof in diverging relation, a bait-carrying loop carried at said end of the body member and extending between the said hooks, a line-attaching loop and a pin-retaining loop extending from the opposite end of the body member, and a piercing point upon the end of the bait-carrying loop for removable engagement with the pin-retaining loop to close the bait-carrying loop.

4. A fishing lure comprising in combination, a body member, a pair of fish hooks carried by the body member and extending from one end thereof in diverging relation, a bait-carrying loop extending from the body member and positioned between said hooks, means for retaining the bait-carrying loop in closed position, and means for attaching the fishing lure to a fishing line.

5. A fishing lure comprising in combination, a body member, a fish hook projecting from one end of the body member, a bait-carrying loop including a pin member extending from said body member closely adjacent to said hook, said pin member having a waved or irregular portion intermediate of its ends, means for attaching a fishing line to said body member, and means carried by the fishing line attaching means for engagement by the pin member of the loop to retain the bait-carrying loop in closing position.

6. A fishing lure comprising in combination, an elongated body member, a fish hook projecting from one end of the body member, a bait-carrying loop including a pin member extending from said body member closely adjacent to said hook, said pin member having a waved or irregular portion intermediate of its ends, a fishing line attaching loop projecting from the opposite end of the body member, and a pin receiving loop upon one end of said fishing line attaching loop for engagement by the pin member to retain the same in closing position.

7. A fishing lure comprising in combination, a body member, a plurality of fishing hooks carried by and extending from one end of the body member, a line-attaching loop carried by and extending from the opposite end of the body member, a keeper loop at the last mentioned end of the body member, a bait-carrying loop at the opposite end of the body member, said bait-carrying loop being adjacent the fishing hooks, and having a free end for engagement in said keeper loop to close the bait-carrying loop, and means for securing the line-attaching loop and the bait-carrying loop to the body member.

8. A fishing lure comprising in combination, a body member, a hook carried by the body member, means carried by the body member, said means comprising a line-attaching loop at one end of the body member, a bait carrier at the other end of the body member, a member connecting said line-attaching loop and carrier and extending through the body member, a pin-retaining loop formed at one end of the line-attaching loop, and a curved body member formed upon the end of the bait carrier for removable engagement with the pin-retaining loop.

9. A fishing lure comprising in combination, a body member, a plurality of fishing hooks carried by the body member and extending in spaced pairs, a bait-carrying loop carried by the body member and disposed closely adjacent to the aforementioned hooks, and means for attaching a fishing line to said fishing lure.

JOSEPH RUIG RIGANDI.